(12) United States Patent
Corich

(10) Patent No.: US 11,771,225 B2
(45) Date of Patent: Oct. 3, 2023

(54) ARTICLES WITH ONE OR MORE VIEWABLE OBJECTS THEREIN

(71) Applicant: 33 3D Acrylics, LLC, Griffith, IN (US)

(72) Inventor: Sonja Ann Corich, Griffith, IN (US)

(73) Assignee: 33 3D Acrylics, LLC, Griffith, IN (US)

( * ) Notice: Subject to any disclaimer, the term of this patent is extended or adjusted under 35 U.S.C. 154(b) by 0 days.

(21) Appl. No.: 17/706,141

(22) Filed: Mar. 28, 2022

(65) Prior Publication Data
US 2022/0304469 A1    Sep. 29, 2022

Related U.S. Application Data

(60) Provisional application No. 63/166,306, filed on Mar. 26, 2021.

(51) Int. Cl.
| | |
|---|---|
| *A47B 96/20* | (2006.01) |
| *A47B 96/06* | (2006.01) |
| *A47B 96/02* | (2006.01) |
| *B29C 39/10* | (2006.01) |
| *G09F 3/20* | (2006.01) |
| *B29L 31/44* | (2006.01) |

(52) U.S. Cl.
CPC .......... *A47B 96/201* (2013.01); *A47B 96/021* (2013.01); *A47B 96/066* (2013.01); *B29C 39/10* (2013.01); *G09F 3/20* (2013.01); *G09F 3/204* (2013.01); *B29K 2995/0026* (2013.01); *B29K 2995/0029* (2013.01); *B29L 2031/44* (2013.01)

(58) Field of Classification Search
CPC ... A47B 96/201; A47B 96/021; A47B 96/066; B29C 39/10; B29K 2995/0026; B29K 2995/0029; B29L 2031/44; A47F 5/0068; A47F 11/06; B44C 5/005; G09F 3/20; G09F 3/204
See application file for complete search history.

(56) References Cited

U.S. PATENT DOCUMENTS

| | | | | |
|---|---|---|---|---|
| 3,705,470 A | * | 12/1972 | Kent .................. | B60J 10/70 29/515 |
| 4,140,224 A | * | 2/1979 | Celeste .............. | A47F 5/0025 40/661.03 |
| 4,223,052 A | * | 9/1980 | Tsuda ................ | C08G 63/672 428/458 |
| 4,428,168 A | * | 1/1984 | Tomer ............... | E04H 13/003 47/41.1 |
| 4,698,928 A | * | 10/1987 | Soporowski ....... | G09F 7/08 40/607.13 |
| 4,898,355 A | * | 2/1990 | Steinway ........... | A47B 96/062 248/248 |
| 6,145,232 A | * | 11/2000 | Bevins .............. | G09F 3/204 40/661 |

(Continued)

*Primary Examiner* — Ko H Chan
(74) *Attorney, Agent, or Firm* — Hartman Global IP Law; Gary M. Hartman; Domenica N. S. Hartman

(57) ABSTRACT

An article includes at least first and second members. A decorative object is within the second member. Interlocking features are adapted to removably interlock the first and second members together. The interlocking features include a channel and a rail that are complementarily shaped so that the rail is receivable within the channel to removably interlock the rail with the channel. At least the second member is formed of a translucent or transparent material so that the decorative object within the second member is visible through the member.

9 Claims, 3 Drawing Sheets

(56) References Cited

U.S. PATENT DOCUMENTS

| | | | | |
|---|---|---|---|---|
| 7,340,855 B2* | 3/2008 | Wiltfang | ............... | G09F 3/204 |
| | | | | 40/658 |
| 8,082,859 B2* | 12/2011 | Sevack | ............... | A47B 96/066 |
| | | | | 248/250 |
| 9,861,198 B2* | 1/2018 | Anderson | ............ | A47B 96/028 |
| 10,130,196 B2* | 11/2018 | Burns | ...................... | A47F 1/12 |
| 10,575,641 B1* | 3/2020 | Severa | ................ | A47B 96/061 |
| 10,706,749 B1* | 7/2020 | White | .................... | G09F 3/204 |
| 2003/0137828 A1* | 7/2003 | Ter-Hovhannisian | .... | F21S 4/20 |
| | | | | 362/249.02 |
| 2004/0264160 A1* | 12/2004 | Bienick | ................. | F25D 27/00 |
| | | | | 362/23.15 |
| 2007/0023374 A1* | 2/2007 | Nawrocki | ............... | A47F 5/0846 |
| | | | | 211/90.01 |
| 2009/0224119 A1* | 9/2009 | Heffernan | ............ | A47B 96/066 |
| | | | | 248/220.21 |
| 2012/0106129 A1* | 5/2012 | Glovatsky | ............ | F25D 23/067 |
| | | | | 362/92 |
| 2019/0201570 A1* | 7/2019 | Dobrinsky | ............ | G01N 21/94 |
| 2019/0261788 A1* | 8/2019 | Ringel | .................... | F21S 8/033 |
| 2020/0329868 A1* | 10/2020 | Mølgaard | ............... | A47F 3/001 |

* cited by examiner

ARTICLES WITH ONE OR MORE VIEWABLE OBJECTS THEREIN

CROSS-REFERENCE TO RELATED APPLICATIONS

This application claims the benefit of U.S. Provisional Application No. 63/166,306 filed Mar. 26, 2021, the contents of which are incorporated herein by reference.

BACKGROUND OF THE INVENTION

The present invention generally relates to articles adapted to display one or more objects recessed below one or more translucent or transparent surfaces of the article such that the objects are viewable through the surfaces and appear to float within the article.

BRIEF DESCRIPTION OF THE INVENTION

According to a nonlimiting aspect of the invention, an article includes first and second members. The first member has a front side defining a front surface of the first member. The second member has a back side and a front side, in which the back side of the second member defines a back surface of the second member and the front side of the second member defines a distal surface of the article. The article further includes a decorative object within the second member and interlocking features adapted to removably interlock the first and second members together. The interlocking features include a channel and a rail that are complementarily shaped so that the rail is receivable within the channel to removably interlock the rail with the channel. The interlocking features are disposed at the front side of the first member and the back surface of the second member. At least the second member is formed of a translucent or transparent material so that the decorative object within the second member is visible through the second member.

According to another nonlimiting aspect of the invention, a shelf is provided that includes first and second shelf members. Each of the first and second shelf members has a back side and a front side. The back side of the first shelf member defines a wall-mounting surface of the shelf, and the front side of the first shelf member defines a front surface of the first shelf member. The back side of the second shelf member defines a back surface of the second shelf member, and the front side of the second shelf member defining a distal surface of the shelf. A decorative object is within the second shelf member. Wall mounting hardware is disposed on the back side of the first shelf member for mounting the first shelf member to a support surface. The wall mounting hardware includes an anchor member that protrudes into the first shelf member through the wall-mounting surface of the first shelf member. Interlocking features are adapted to removably interlock the first and second shelf members together. The interlocking features include a channel and a rail that are complementarily shaped so that the rail is receivable within the channel to removably interlock the rail with the channel. The interlocking features are disposed at the front and back surfaces of the first and second shelf members, respectively, so that the distal surface of the shelf at the front side of the second shelf member is oppositely disposed from the wall-mounting surface of the shelf at the back side of the first shelf member when the rail and the channel are removably interlocked together. At least the second shelf member is formed of a translucent or transparent material so that the decorative object within the second shelf member is visible through the second shelf member.

According to another nonlimiting aspect of the invention, a method of forming the shelf includes placing a quantity of liquid polymer and a decorative object in a mold cavity so that the decorative object is entirely immersed in the liquid polymer, and curing the liquid polymer to form the second shelf member and so that the decorative object is completely embedded within the second shelf member.

Technical effects of a shelf having elements as described above preferably include the capability of selectively reconfiguring the shelf to display objects within the shelf that are viewable through one or more surfaces of the shelf.

Other aspects and advantages of this invention will be further appreciated from the following detailed description.

DETAILED DESCRIPTION OF THE INVENTION

Figure 1:
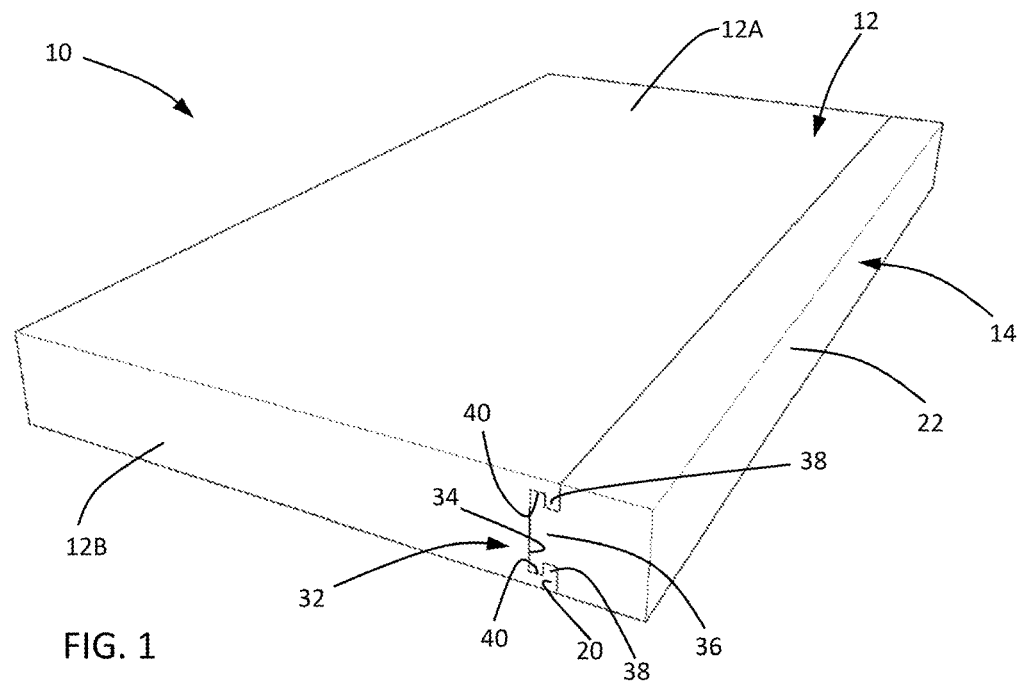
FIG. 1 schematic representation of a nonlimiting embodiment of a shelf in accordance with certain aspects of the invention, wherein surfaces of the shelf are opaque for illustrative purposes.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular depicted embodiment could be eliminated. Therefore, the appended claims, and not the detailed description, are intended to particularly point out subject matter regarded to be aspects of the invention, including certain but not necessarily all of the aspects and alternatives described in the detailed description.

Figure 2:
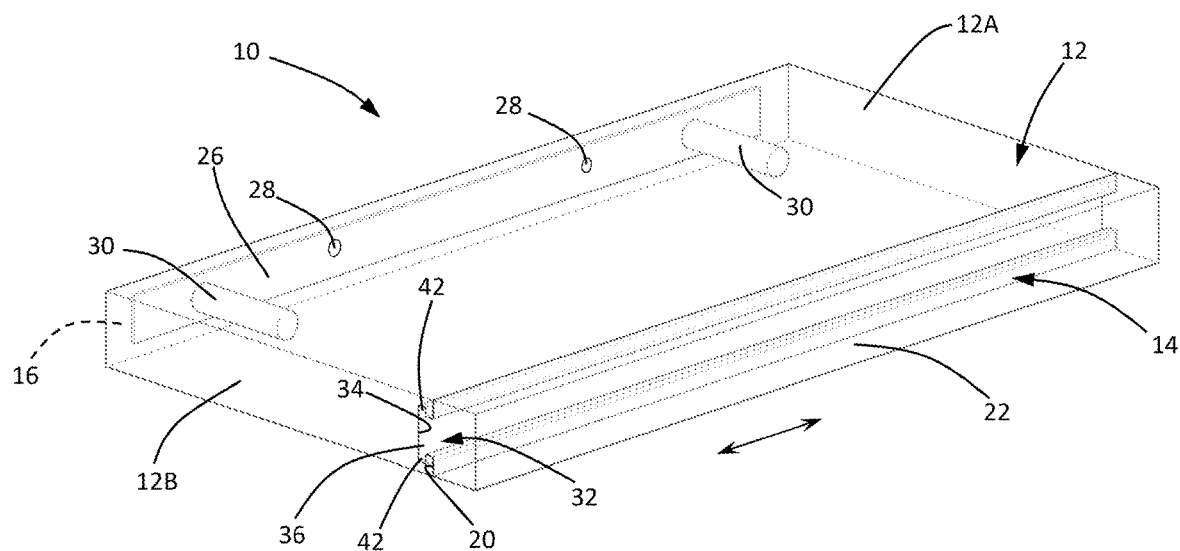
FIG. 2 schematically represents the shelf of FIG. 1 representing the shelf as translucent or transparent to reveal features of the shelf that are within or behind the shelf as viewed in FIG. 2.
Figure 3:
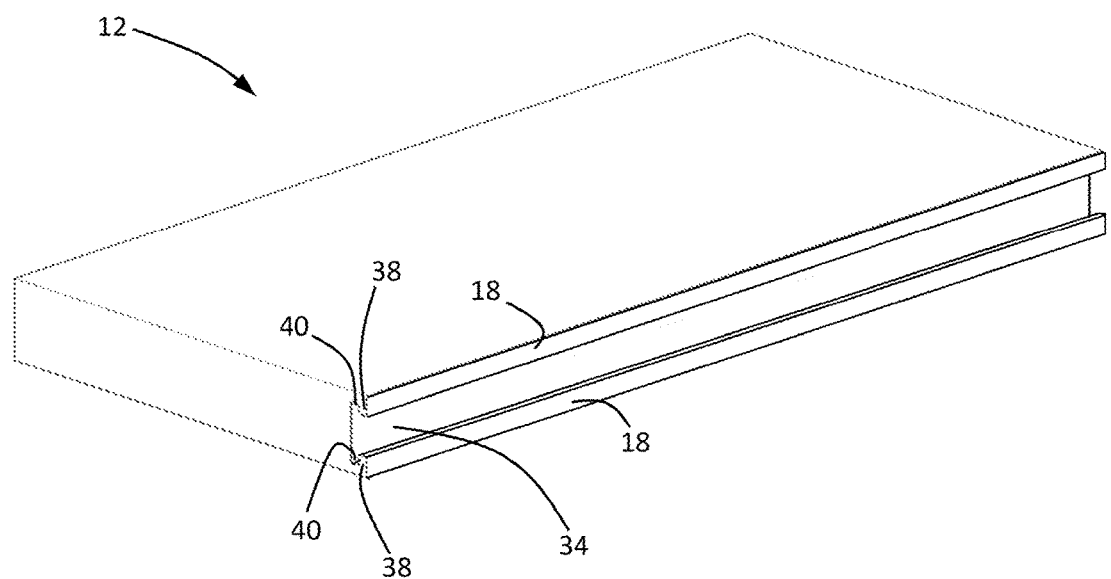
FIG. 3 schematically represents a base member of the shelf of FIGS. 1 and 2.
Figure 4:
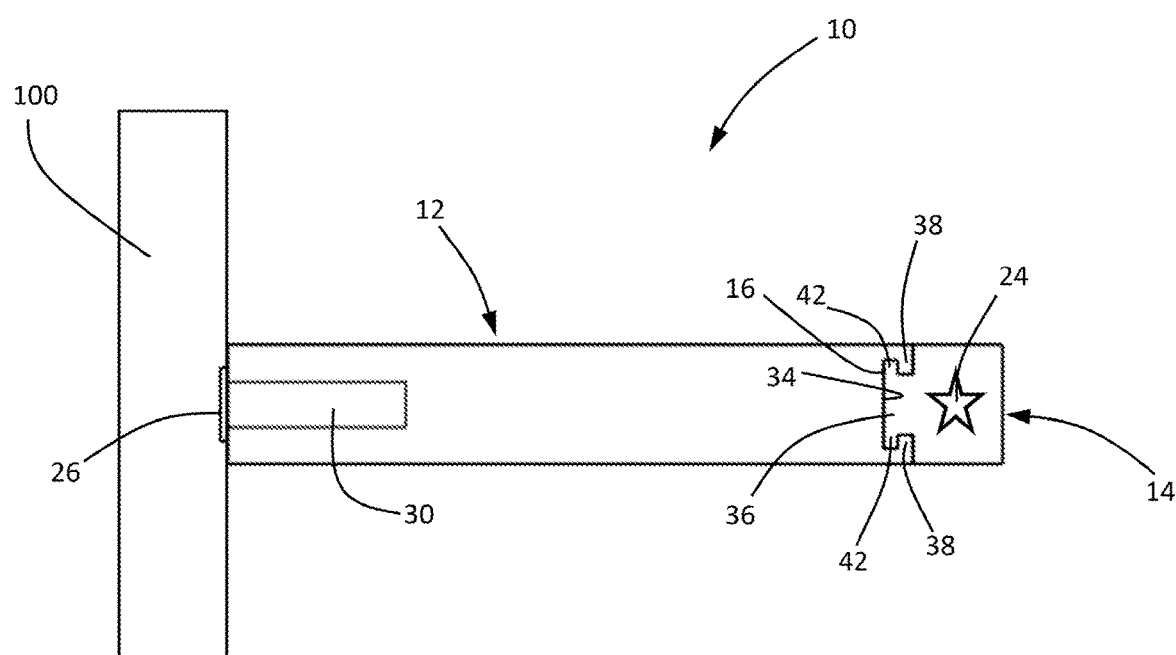
FIG. 4 schematically represents a cross-sectional view of the shelf of FIGS. 1 through 3.
Figure 5:
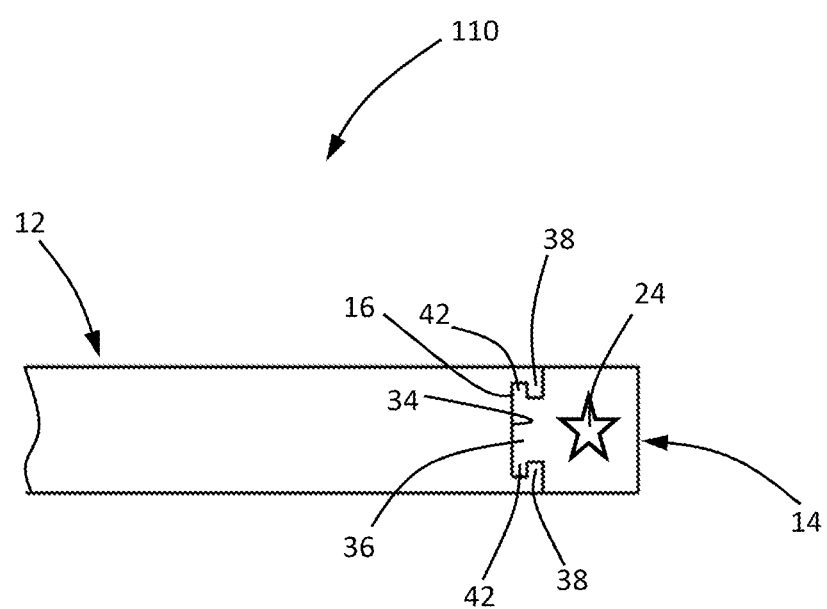
FIG. 5 schematically represents a cross-sectional view of an article in accordance with certain aspects of the invention.

FIGS. 1 through 5 schematically represent a nonlimiting embodiments of articles, including a shelf 10 and a second article 110, for example, podium, table, etc., and components thereof that are adapted to be placed on or mounted to a support surface, an example of the latter being a wall 100 as represented in FIG. 4. To facilitate the description provided below of the embodiment(s) represented in the drawings, relative terms, including but not limited to, "proximal," "distal," "vertical," "horizontal," "lateral," "front," "rear," "side," "forward," "rearward," "top," "bottom," "upper," "lower," "above," "below," "right," "left," etc., may be used in reference to the orientation of the shelf 10 as installed on the wall 100 as represented in FIG. 4 or the orientation of the article 110 when oriented as represented in FIG. 5. All such relative terms are intended to indicate the construction and relative orientations of components and features of the articles and therefore are relative terms that are useful to describe the illustrated embodiment but should not be otherwise interpreted as limiting the scope of the invention.

The shelf 10 is represented in FIGS. 1 through 4 as comprising a first shelf member 12 and a second shelf member 14. A back side of the first shelf member 12 defines a wall-mounting surface 16 (FIG. 2) of the shelf 10, and a front side of the first shelf member 12 defines a front surface 18 (FIG. 3) of the first shelf member 12. A back side of the second shelf member 14 defines a back surface 20 of the second shelf member 14, and a front side of the second shelf member 14 defines a distal surface 22 of the shelf 10. The front surface 18 of the first shelf member 12 and the back surface 20 of the second shelf member 14 are represented as being planar and parallel to one another. The first shelf member 12 is represented as having upper and lower surfaces (e.g., the upper surface 12A) and lateral surfaces (e.g., the lateral surface 12B) that define the exterior surfaces of the first shelf member 12. In the nonlimiting embodiment represented, the first shelf member 12 is larger in size than the second shelf member 14, and as such the exterior surfaces 12A and 12B predominantly define the exterior surfaces of the shelf 10.

The shelf 10 includes wall mounting hardware (FIG. 2) disposed on the back side of the first shelf member 12 for mounting the first shelf member 12 to the wall 100 or other suitable support surface. The wall mounting hardware is represented as comprising a wall plate 26 secured to the wall-mounting surface 16 of the first shelf member 12, holes 28 in the wall plate 26 by which the wall plate 26 can be removably secured to the wall 100 with appropriate wall-mounting fasteners (not shown), and one or more anchor members 30 that each protrude into the first shelf member 12 through the wall-mounting surface 16 of the first shelf member. The anchor members 30 are preferably though not necessarily received in complementary-shaped cavities or bores that extend into the first shelf member 12 from its wall-mounting surface 16. The anchor members 30 are preferably sufficiently long so as to be able to support the combined weight of the first and second shelf members 12 and 14 when the shelf 10 is secured to the wall 100 with the wall mounting hardware.

The shelf 10 is represented as further including interlocking features 32 that are adapted to removably interlock the first and second shelf members 12 and 14 together. The interlocking features 32 comprise a channel 34 and a rail 36 that are complementarily shaped so that the rail 36 is receivable within the channel 34 to removably interlock the rail 36 with the channel 34. The interlocking features 32 are disposed at the front surface 18 of the first shelf member 12 and the back surface 20 of the second shelf member 14 so that the distal surface 22 of the shelf 10 at the front side of the second shelf member 14 is oppositely disposed from the wall-mounting surface 16 of the shelf 10 at the back side of the first shelf member 12 when the rail 36 and the channel 34 are removably interlocked together. In the particular but nonlimiting embodiment shown, the channel 34 is recessed in the front surface 18 at the front side of the first shelf member 12, and the rail 36 protrudes from the back surface 20 at the back side of the second shelf member 14. Furthermore, the nonlimiting embodiment represents the channel 34 as defining a pair of shoulders 38 that project over the channel 34, creating secondary channels 40 that receive complementary flanges 42 that extend from the rail 36 of the second shelf member 14. The channel 34 and rail 36 are configured so that, as indicated by the double-headed arrow in FIG. 2, the second shelf member 14 must be translated parallel to the front surface 18 of the first shelf member 12 to remove the second shelf member 14 from and install the second shelf member 14 on the first shelf member 12.

FIG. 4 represents a decorative object 24 embedded within the second shelf member 14. According to a preferred aspect of the invention, the second shelf member 14 is formed of translucent and/or transparent materials so that the decorative object 24 within the second shelf member 14 is visible through the second shelf member 14. The decorative object 24 may be a two-dimensional (2D) or three-dimensional (3D) object 24 to provide a decorative effect to the shelf 10. Furthermore, the decorative object 24 is preferably embedded in the translucent or transparent material of the second shelf member 14 so that it is in a fixed position within the second shelf member 14.

The shelf 10 may be provided as a kit that contains any number of the second shelf member 14 equipped similarly to the second shelf member 14 represented in FIGS. 1, 2, and 3 such that the decorative effect of the shelf 10 can be modified by interchanging second shelf members 14 that have different embedded objects 24.

According to another preferred aspect of the invention, the first shelf member 14 may also be formed of translucent and/or transparent materials, in which case (as evident from FIG. 2) the anchor members 30 protruding into the first shelf member 12 are visible through one or more surfaces of the first shelf member 12.

The first and second shelf members 12 and 14 can be formed using a molding operation in which a quantity of liquid material is placed in a mold cavity and then cured. In the case of the second shelf member 14, the decorative object 24 is also placed in the mold cavity so that the decorative object 24 is entirely immersed in the liquid material, such that curing the liquid material to form the second shelf member 14 results in the decorative object 24 being completely embedded within the second shelf member 14.

The translucent and transparent materials used to form the first and second shelf members 12 and 14 may include, but are not limited to, various transparent and translucent polymer materials (e.g., poly(methyl methacrylate) (PMMA)) and glass materials. Although the shelf 10 represented in the drawings comprises shelf members 12 and 14 that are each translucent or transparent, it is within the scope of the invention that the first shelf member 12 could be formed of an opaque material such as metals, ceramics, composites, or woods. In addition, portions of the second shelf member 14 may be opaque or semi-transparent. For example, the second shelf member 14 may include a transparent or translucent window surrounded by an opaque or translucent frame, for example, wood, metal, frosted glass, etc. Furthermore, although the shelf 10 represented in the drawings comprises two shelf members 12 and 14, it is foreseeable that additional shelf members could be assembled to create the shelf 10. For example, an intermediate shelf member (not shown) could be provided with interlocking features on opposite sides thereof for interlocking with the interlocking features 32 of the first and second shelf members 12 and 14 depicted in the drawings.

In FIG. 5, consistent reference numbers are used to identify components that are the same or functional equivalents of components identified in FIGS. 1 through 4. In view of similarities between the shelf 10 of FIGS. 1 through 4 and the article 110 of FIG. 5, the following discussion of FIG. 5 will focus primarily on aspects of the article 110 that differ from the shelf 10 in some notable or significant manner. Other aspects of the article 110 not discussed in any detail can be, in terms of structure, function, materials, etc., essentially as was described for the shelf 10.

FIG. 5 represents the article 110 (as nonlimiting examples, a podium or table) comprising first and second members 12 and 14 in which a decorative object 24 is embedded within the second member 14. The first member 12 may be, for example, an integral front edge portion of a table, podium, or other type of furnishing, which may be directly supported on a floor or placed on an object (such as the legs of a table or the base of a podium) supported on a floor. As with the embodiment of the shelf 10 represented in FIGS. 1 through 4, the second member 14 is formed of translucent and/or transparent materials so that the decorative object 24 within the second member 14 is visible through the second member 14 to provide a decorative effect to the article 110. Furthermore, the decorative object 24 is preferably embedded in the translucent or transparent material of the second member 14 so that it is in a fixed position within the second member 14.

As previously noted above, though the foregoing detailed description describes certain aspects of one or more particular embodiments of the invention alternatives could be adopted by one skilled in the art. For example, the articles 10 and 110 and their components could differ in appearance and construction from the embodiment described herein and shown in the drawings, functions of certain components of the articles 10 and 110 could be performed by components of different construction but capable of a similar (though not necessarily equivalent) function, and appropriate materials could be substituted for those noted. As such, and again as was previously noted, it should be understood that the invention is not necessarily limited to any particular embodiment described herein or illustrated in the drawings.

The invention claimed is:

1. A shelf comprising:
   a first shelf member having a back side and a front side, the back side of the first shelf member defining a wall-mounting surface of the shelf, the front side of the first shelf member defining a front surface of the first shelf member, the first shelf member comprising a first material that is translucent or transparent;
   a second shelf member adapted to be installed on the front side of the first shelf member to provide a decorative effect to the shelf, the second shelf member having a back side and a front side, the back side of the second shelf member defining a back surface of the second shelf member, the front side of the second shelf member defining a distal surface of the shelf, the second shelf member being formed of a second material that is translucent or transparent, the first shelf member being larger in size than the second shelf member such that exterior surfaces of the first shelf member predominantly define exterior surfaces of the shelf when the second shelf member is installed on the first shelf member;
   a first decorative object completely embedded within the second shelf member and visible through the second material of the second shelf member, the first decorative object being a three-dimensional decorative object that is embedded in the second material of the second shelf member so that the first decorative object is in a fixed position within the second shelf member;
   wall mounting hardware disposed on the back side of the first shelf member for mounting the first shelf member to a support surface, the wall mounting hardware comprising an anchor member that protrudes into the first shelf member through the wall-mounting surface of the first shelf member;
   a third shelf member adapted to be installed on the front side of the first shelf member to provide a decorative effect to the shelf, the third shelf member having a back side and a front side, the back side of the third shelf member defining a back surface of the third shelf member, the third shelf member being formed of a third material that is translucent or transparent, the first shelf member being larger in size than the third shelf member such that the exterior surfaces of the first shelf member predominantly define the exterior surfaces of the shelf when the third shelf member is installed on the first shelf member;
   a second decorative object completely embedded within the third shelf member and visible through the third material of the third shelf member, the second decorative object being a three-dimensional decorative object that is embedded in the third material of the third shelf member so that the second decorative object is in a fixed position within the third shelf member; and
   interlocking features adapted to selectively and removably interlock the first shelf member with the second and third shelf members, the interlocking features comprising a channel and a rail that are complementarily shaped so that the rail is receivable within the channel to removably interlock the rail with the channel, the interlocking features being disposed at the front surface of the first shelf member and the back surface of each of the second and third shelf members so that, when the second shelf member or the third shelf member is installed on the first shelf member, the distal surface of the shelf at the front side of respectively the second shelf member or the third shelf member is oppositely disposed from the wall-mounting surface of the shelf at the back side of the first shelf member when the rail and the channel are removably interlocked together;
   wherein the first decorative object is visible through all surfaces of the second shelf member and through the first material of the first shelf when the second shelf member is installed on the first shelf member;
   wherein the second decorative object is visible through all surfaces of the third shelf member and through the first material of the first shelf when the third shelf member is installed on the first shelf member; and
   wherein the decorative effect of the shelf is modified by interchanging the second shelf member and the third shelf member.

2. The shelf of claim 1, wherein the channel is recessed in the front surface at the front side of the first shelf member, and the rail protrudes from the back surface at the back side of the second shelf member.

3. The shelf of claim 1, wherein the first shelf member is formed of the first material so that the anchor member within the first shelf member is visible through at least one surface of the first shelf member.

4. The shelf of claim 3, wherein the anchor member is visible through multiple surfaces of the first shelf member.

5. The shelf of claim 1, wherein the front surface of the first shelf member and the back surface of the second shelf member are planar and parallel to one another.

6. The shelf of claim 1, wherein the channel and the rail are configured so that the second shelf member must be translated parallel to the front surface of the first shelf member to remove the second shelf member from and install the second shelf member on the first shelf member.

7. The shelf of claim 1, wherein the anchor member is received within a cavity within the first shelf member.

8. A method of forming the shelf of claim 1, the method comprising:
- placing a quantity of liquid polymer and the first decorative object in a mold cavity so that the first decorative object is entirely immersed in the liquid polymer; and
- curing the liquid polymer to form the second shelf member and so that the first decorative object is completely embedded within the second shelf member.

9. The shelf of claim 1, wherein the shelf is a part of a podium or a table.

* * * * *